UNITED STATES PATENT OFFICE.

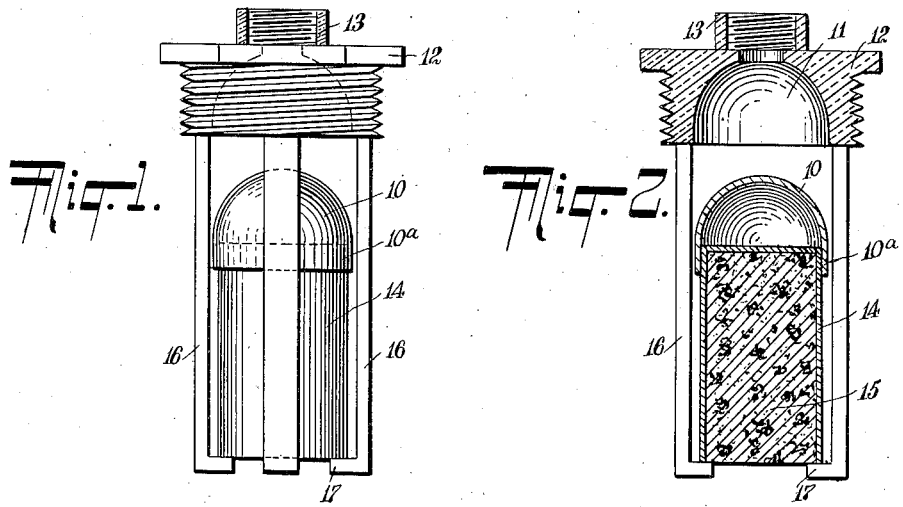

JAMES D. ROBERTSON, OF CANTON, ILLINOIS.

VALVE.

1,006,403.     Specification of Letters Patent.     Patented Oct. 17, 1911.

Application filed December 21, 1909. Serial No. 534,336.

*To all whom it may concern:*

Be it known that I, JAMES D. ROBERTSON, a citizen of the United States, and a resident of Canton, in the county of Fulton and State of Illinois, have invented a new and Improved Valve, of which the following is a full, clear, and exact description.

The invention is an improvement in valves for general purposes, such as tank valves where it is desired to prevent the overflow of water without interfering with the circulation of air or steam; radiator valves and check valves.

The object of the invention is to provide a float-actuated valve which is freely movable within a cage and adapted to seat over and close an outlet formed within a plug, the plug having an approximately hemispherical seat, and the valve having a head of like form and size to bear against the seat, and approximately equal in diameter to the internal diameter of the cage, whereby a relatively large bearing surface between the valve and the seat is afforded.

Reference is to be had to the accompanying drawings forming a part of this specification, in which similar characters of reference indicate corresponding parts in all the views.

Figure 1 is a side view, partly in vertical section, of a float valve constructed in accordance with my invention; and Fig. 2 is a central vertical section of the same.

In the accompanying drawing I have shown a float valve embodying my improvement, the same comprising a valve head 10 having a convex seating end, shown to be approximately hemispherical, with an extended cylindrical body portion 10ᵃ, and arranged to pass within a counterpart seat 11, formed within an externally screw-threaded plug 12, the latter having a pipe connection 13. The valve head is of thimble form and fits over and is secured to a cylindrical float 14 filled with some buoyant material, as cork 15, to cause the valve to float in water. The valve is movably confined and guided in a cage consisting of a number of legs 16 depending from the plug and having inwardly-turned feet or projections 17 to limit the drop of the valve from its seat. The valve as thus constructed is especially designed for tanks, to prevent the overflow of water without interfering with the circulation of air and steam, the valve obviously rising and being forced tight to its seat by the rise of the liquid level.

Having thus described my invention, I claim as new and desire to secure by Letters Patent:

A valve comprising a screw threaded plug having a hemi-spherical valve seat on its inner face, an opening leading from the seat through the top, and a pipe connection registering with said opening, a cage formed of a plurality of members projecting from the lower face of the plug, an elongated cylindrical float in the cage, and a hollow hemi-spherical head on the upper end of the float and forming a valve adapted to seat in the seat of the said plug.

In testimony whereof I have signed my name to this specification in the presence of two subscribing witnesses.

JAMES D. ROBERTSON.

Witnesses:
  P. S. SCHOLES,
  H. C. MORAN.